United States Patent [19]

Bowen et al.

[11] 3,919,635

[45] Nov. 11, 1975

[54] APPARATUS AND METHOD FOR DETECTING HOLES IN DIELECTRIC SHEET MATERIALS

[75] Inventors: James Harold Bowen, Hillsborough Township; Edward Flowers, South Plainfield, both of N.J.

[73] Assignee: Union Carbide Corporation, New York, N.Y.

[22] Filed: Jan. 19, 1973

[21] Appl. No.: 325,083

Related U.S. Application Data

[63] Continuation of Ser. No. 138,245, April 28, 1971, abandoned, which is a continuation-in-part of Ser. No. 956,577, Sept. 10, 1969, abandoned.

[52] U.S. Cl. ................................................ 324/54
[51] Int. Cl.² ........................................ G01R 31/12
[58] Field of Search ............................... 324/54, 72

[56] References Cited
UNITED STATES PATENTS

| | | |
|---|---|---|
| 2,701,336 | 2/1955 | Anderson ............................ 324/54 |
| 2,890,409 | 6/1959 | VanKrevelen ........................ 324/54 |
| 2,941,144 | 6/1960 | Cannon ................................ 324/54 |
| 2,942,248 | 6/1960 | Huggins ............................ 324/54 X |
| 2,965,755 | 12/1960 | West ................................ 324/54 X |
| 2,978,636 | 4/1961 | Fountain ............................. 324/54 |
| 3,321,703 | 5/1967 | Tyszewicz ........................... 324/54 |
| 3,358,378 | 12/1967 | Downs ............................. 324/72 X |

*Primary Examiner*—Gerard R. Strecker
*Attorney, Agent, or Firm*—Maurice W. Ryan

[57] ABSTRACT

A hole detector for processing dielectric webs operates by first charging the web with a primary electrode and then applying a secondary charge with a detector electrode. This permits better control of the arcing through pinholes which is used to detect their presence.

11 Claims, 5 Drawing Figures

INVENTORS
JAMES H. BOWEN
EDWARD FLOWERS
BY
J. Hart Evans
ATTORNEY

APPARATUS AND METHOD FOR DETECTING HOLES IN DIELECTRIC SHEET MATERIALS

This is a continuation, of application Ser. No. 138,245 filed Apr. 28, 1971, now abandoned, which in turn is a continuation-in-part of application Ser. No. 856,577 filed Sept. 10, 1969, now abandoned.

This invention relates to an improved method and apparatus for detecting small holes in webs of dielectric mateirals. Such holes commonly called pinholes, can occur in various types of unsupported dielectric webs such as vinyl film, paper and rubber sheeting as well as in dielectric coatings on electrically conductive substrates such as vinyl coated steel. These pinholes can result from various causes, particularly imperfections in the processing rolls and equipment, and the presence of stray bits of foreign material such as dust, abrasive grit and the like, which come in contact with the web. Visual detection of any but the largest imperfections is extremely difficult. Such dielectric webs are commonly run commercially at speeds ranging from several hundred feet per minute for vinyl films up to several thousand feet per minute for paper, speeds which make visual inspection virtually impossible.

It is important, and often essential, nonetheless, to inspect for pinholes. Depending upon the type and intended use of the web, it may be sufficient to merely monitor the number of pinholes in a given area of web so that the material can be rejected when this number exceeds a predetermined limit. In other cases it may be necessary to mark the location of each detected pinhole so that it can be patched or the defective section of web removed.

The pinhole detectors commercially available today, none of which are entirely satisfactory, are generally of one of three types. Optical detectors employ visible or ultraviolet light sources and compatible sensing transducers. This is the only type out of the three which can be used to monitor electrically conductive webs and is commonly used for checking sheet metal. A major disadvantage is that these systems require that the sheet to be tested be opaque.

A second class of monitor systems includes those of the electric conduction type which consist of low voltage probes which physically contact the material being inspected. Conduction requires direct contact with the web, either by the probe itself and a conductor, or through a liquid intermediary, such as a wet sponge. Such systems are restricted to detecting relatively large pinholes, i.e. 10 mils or greater in the case of the dry probes. The devices using a liquid intermediary can sense 1 mil holes, but are restricted to manual operation because of the relatively slow speed of response to small holes, and the problem of water marking.

The third class or type are spark discharge detectors which consist of high voltage AC or DC electrodes spaced above or mechanically contacting the material being inspected. An idler roll or back-up plate serves as the other electrode, and detection is achieved by sparks discharging between the electrodes through the hole. Operating voltages range from 500 to 10,000 volts.

When a dielectric is subjected to an electrical charge in such detector apparatus the dielectric becomes charged in the manner of a capacitor when exposed to a high potential. This charging effect on a moving dielectric web passing between electrodes may be expressed by the following equation:

$$e = E[1 - e^{-d(10^8)/Rg22.5KwS}].$$

wherein $e$ is the voltage on the web due to the charge accumulation (volts)

$E$ is the electrode voltage (volts)

$d$ is the web thickness (inches)

$Rg$ is the resistance of the gap between the electrode and the web (ohms) as calculated from voltage and current measurements in the circuit.

$K$ is the dielectric constant of the web.

$w$ is the web width (inches).

$S$ is the web speed (inches per second).

The above variable parameters affect directly the effective capacitance of the system. Making the web thinner and/or wider increases the effective capacitance of the system, and increasing the speed at which the web travels has the same effect. And of course, a higher dielectric constant for the web means a higher effective capacitance for the system.

When the effective capacitance of the system is high the gap currents which exist between the electrode and the web will be correspondingly high. Under such circumstances operating reliability can be adversely affected by changes in any of the variable parameters discussed above, causing electrode voltage fluctuations due to variations in the average current. When the web width is 48 inches or more the gap current can be large enough to prevent detection of the spark through a pinhole when using a conventional spark detector device. A conventional detector which works reasonably well with a material of low dielectric constant such as paper processed at relatively low speed may be less than satisfactory when the paper is run at high speed or when the web is a material of relatively high dielectric constant such as vinyl film.

We have now discovered an improved spark detection process and apparatus which are reliable over a wide range of effective capacitance in the system. We can test webs of various thickness, width and dielectric constant of various speeds. In addition to its general advantages our process permits the testing of webs with high dielectric constants which were heretofore very difficult to test.

Our invention can best be understood with reference to the drawings. In the drawings FIG. 1 is a schematic view of an apparatus according to the invention designed to carry out the process of the invention as applied to self-supporting vinyl webs. FIG. 1A is a view of a portion of the apparatus of FIG. 1 showing the apparatus adapted for application to dielectric webs which are coated on or laminated to electrically conductive substrates.

Figure 1:
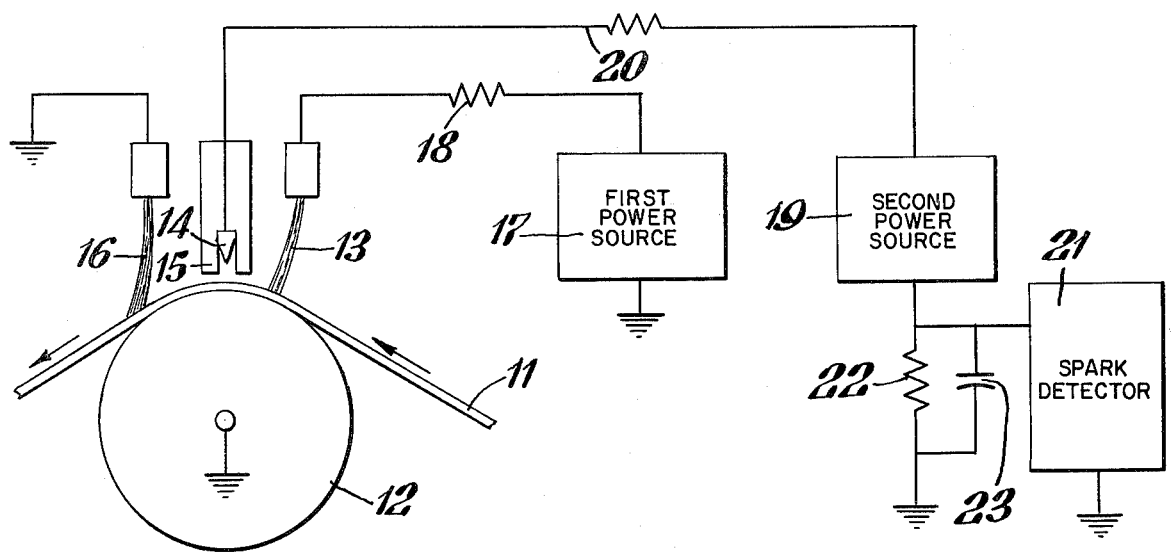

The invention can be described in detail with reference to the drawings as follows:

In FIG. 1 an unsupported dielectric web 11 is passed in the direction shown over a grounded, electrically conductive roller 12. The web 11 is first contacted by a primary electrode 13 which imparts a basic electric charge to the surface of the web 11. The web 11 next passes beneath a detector electrode 14 which in the embodiment shown is shielded on both sides by dielectric material 15. The detector electrodes 14 impinges a secondary detector current onto the web 11. In the embodiment shown, the web 11 is contacted by a grounded charge removal electrode 16 which removes the previously applied charge from the film web 11.

The primary electrode 13 is supplied with current from a first power source 17 through a resistor 18. The detector electrode 14 is supplied with current from a second power source 19 through a resistor 20. In circuit with the second power source 19 is a spark detector device 21 in a circuit which includes a resistor 22 and a capacitor 23. When a pinhole in web 11 passes under the detector electrode 14 a spark discharge occurs through the pinhole. The surge of current accompanying this spark discharge is registered by the spark detector device 21. The spark detector device 21 includes a relay, or the like, which is actuated by the current surge of the detector current through a pinhole, and this triggers any desired device such as a counter, signal light, alarm bell, web marker or the like.

Figures 1A, 2:
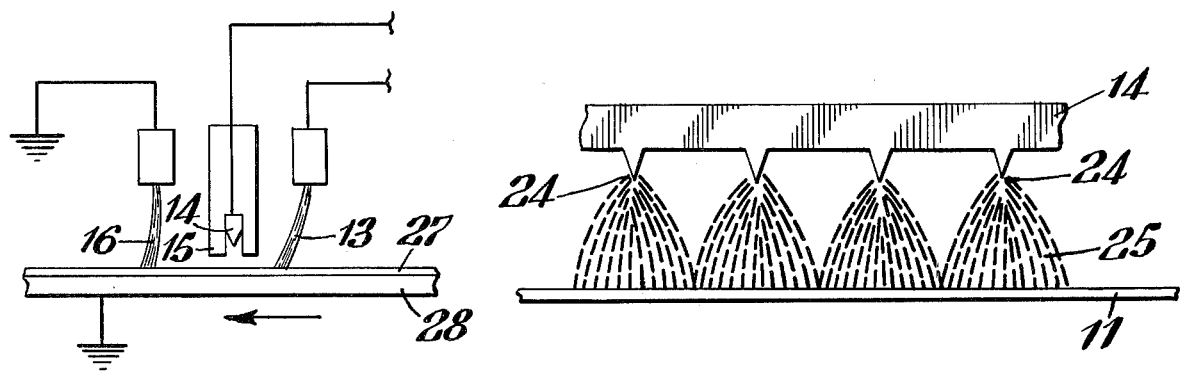
FIG. 2 is a frontal elevation of a section of a toothed electrode showing a desired pattern of detector current discharge onto a dielectric web.

In FIG. 1A a dielectric web 27 is coated on or laminated to an electrically conductive substrate 28 and the coated substrate or laminate is passed in the direction shown under the same electrodes 13, 14, and 16 as is the unsupported web 11 in FIG. 1. These electrodes 13 and 14 are connected to the same power sources 17 and 19 and detector device 21 as in FIG. 1, with same resistor 22 and capacitor 23 in circuit with the second power source. Electrode 16 is grounded as in FIG. 1 but as can be seen the grounded roller 12 is not used. Because the substrate 28 is electrically conductive it is necessary only to ground the substrate 28 is shown.

FIG. 2 is a preferred design for the detector electrode 14 positioned above the dielectric web 11. In this embodiment the electrode 14 has configuration of a plurality of spaced apart points 24. The spacing of these points 24 is such that the adjacent conical showers of current 25 meet so as to provide a charge application over the total width of the web 11.

Figure 3:
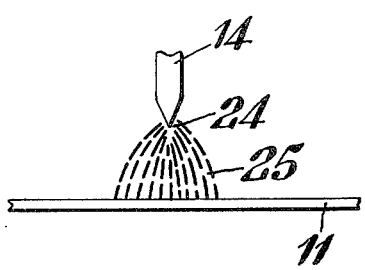
FIG. 3 is a side elevation of the electrode depicted in FIG. 2 showing the pattern of current discharge with an unshielded electrode.

FIG. 3 is a partial side view of an electrode 14 of the type of FIG. 2 having points 24, and as would be expected, the shower of sparks 25 is conical and symmetrical, and this spreads out over the dielectric web 11.

Figure 4:
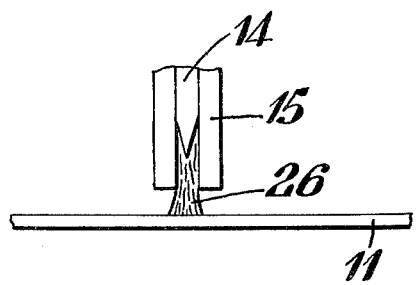
FIG. 4 is a side elevation of an electrode similar to that of FIG. 3, but shielded with dielectric material, and thus shows the pattern of electrical discharge from a shielded electrode.

In FIG. 4, the detector electrode 14 is shielded by dielectric material 15, and thus as seen from the side the shielded shower of current 26 is not spread out in a conical fashion, but is much more sharply defined as it impinges on the dielectric web 11.

The hole detector of our invention is useful in examining any dielectric web. Such webs include self-supported webs of paper of various types and thicknesses, rubber sheeting and various plastic films such as vinyls, polyethylenes, polypropylenes, polysulfones, the acetates, cellophane and the like. Our invention can also be used to examine dielectric webs which have been coated on or laminated with electrically conductive substrates such as steel, copper, aluminum or the like. A dielectric coating sprayed, calendered or otherwise applied to such a substrate can have so-called pinholes or similar discontinuities as can laminated webs. A typical example would be vinyl resin coated on the steel plate.

The superiority of our process and apparatus as compared to known spark detection methods and equipment derives from the character of the detector current employed. In the prior art methods a single electrode was employed and the charge which had to be applied to the web to achieve a spark discharge through any pinhole present was quite large due to the necessity of charging up the total web surface. When a pinhole was encountered using the prior art machines only a relatively small incremental charge in current would occur due to the spark discharge through the pinhole and thus the device employed would have to sense and register a relatively small fluctuation in current. This of course restricts accuracy and speed when using such devices. The large detector currents thus employed frequently mar many types of dielectric webs such as papers and plastic films by enlarging the pinhole or charring around it.

According to our invention, we obviate the difficulties of the prior art by first applying a relatively large charge to the dielectric web before detection. Our basic or preliminary charge can be applied with an electrode contacting the material, such as a wire brush, which eliminates the danger of burnthrough, and reduces the voltage necessary to charge the web, since there is no need to ionize the air gap between the electrode and the web, there being no gap between our primary electrode and the web.

Thus by charging the dielectric web prior to the detection step and attendant addition of the detector charge, a relatively small normal detector operating current will exist. This current is small enough that when a pinhole is encountered the change in detector electrode current due to the spark discharge will be of substantial magnitude relative to the normal detector current and thus easy to detact. It is even possible, though not necessarily preferable, to operate out process with a basic or preliminary charge sufficiently high that there is no current flow from the detector electrode in the absence of a pinhole. With our process we readily detect pinholes as small as 1 mil in diameter, with no damage to the web.

Our basic charge is preferably applied with a brush electrode contacting the web. We have found that from the 3,000 to 10,000 volts from the power source, put through a resistor of 0.5 to 5 megohms will deliver the current of up to 20 milliampers preferred for the basic charge. These values will be good for example when examining vinyl film of 4 or 5 foot width. Factors such as electrode width across the web, web speed, web material, web thickness and the like are all factors affecting the required current and voltage and the resistance best suited to achieve it. Thus increased effective capacitance may require lower resistors in the circuit to permit the desired charging currents of up to 20 milliamps. Some paper stock, for example, may require more current which will mean more milliamps for the basic charge. The detector charge normally remains the same, except that extreme web widths may require higher current. Control and adjustment of such variables for a particular web is well within the ability of one skilled in the art.

The detector charge will be applied by a detector electrode which in our preferred embodiment has a plurality of equally spaced points across its width. Spacing should be such that for the chosen gap between the electrode and the web, the shower of current impinging on the web will be continuous across the width of the electrode without gaps. Such spacing is illustrated in FIG. 2 of the drawing. We have found that a saw blade such as a hack-saw blade or a band-saw blade, having from 8 through 16 teeth per inch, makes an excellent detector electrode.

As FIG. 4 of the drawing illustrates, it has been found that an electrode shielded by strips of dielectric material on both sides will give a lower gap current than will an unguarded electrode as illustrated in FIG. 3, thus further increasing the electrode sensitivity. As can be seen in FIG. 3 these guard strips or shields extend below the points of the electrode, preferably about 1/16 inch. They are preferably made of a dielectric which is resistant to carbonization in the presence of an arc. We have found melamine type plastics to be quite suitable. For the secondary power source, that is, the source of power to the detector electrode, we have found from 5,000 to 15,000 volts to be satisfactory when put through a resistor of 5 to 20 megohms, so as to yield up to 1 milliampere of current.

In addition to the variables mentioned above with respect to the primary electrode, the detector electrode is subject to the additional variable of the gap between the web and the electrode. This is necessary to attain sharp definition of the detector charge, but should not be unduly great, as any gap requires additional voltage to ionize the air. We have found about 1/8 inch to be ideal for most circumstances, although the gap could be less and can be as great as about 1/4 inch. As with the charge from the primary electrode, a thicker web will require less amperes while faster web speed will increase the amperage requirement.

A spark detector device can be any commercially available detector means for detecting transmission voltage such as a thyratron detector or a thyristor. When used with a resistor and a capacitor as illustrated in FIG. 1, the resistor may be from 1,000 to 100,000 ohms, and the capacitor from 0.1 to 1.0 microfarad.

A web of embossed, plasticized polyvinyl chloride homopolymer film of 0.004 inch thickness and 54 inches wide was deliberately penetrated with random pinholes of from 1 to 15 mils in diameter. The web was then processed according to our invention by passing it first under a charging electrode and then under a detector electrode, while pulling it over a grounded metal roller at a web speed of 180 feet per minute or 30 inches per second. The primary or charging electrode was a brush-like strip of metal tinsel 48 inches long, the bristles of which contacted the web of film and delivered a current of 1.75 milliamperes at 3,000 volts through a resistor of 4 megohms.

The detector electrode was a band-saw blade 48 inches long with 12 teeth per inch. Strips of 1/16 inch thick polyethylene were fastened to both sides of the blade to shield the electrode by extending 1/16 inch below the points of the saw teeth, the electrode being suspended so that the points of the saw teeth were 1/8 inch above the moving web of film. A 10,000 volt power supply delivered at 9000 volts through a 12 megohm resistor a 140 microamp current. Pinholes were counted by an electro-mechanical counter in the detector electrode circuit. A grounded brush-like strip of metal tinsel in contact with the web after it passed the detector electrode was used to remove the charge. All of the pinholes which had been made in this web were detected and recorded by the device.

What is claimed is:
1. Apparatus for detecting small holes in a sheet of dielectric material comprising, in combination:
   electrically conductive means in electrical contact with one surface of said sheet material;
   an electrical ground in circuit with said electrically conductive means;
   an electrical charging electrode impinging on the other surface of said sheet material;
   a first electric power source in circuit with said electrical charging electrode, and said electrical ground for imposing an electrical charge on said other surface of said sheet material;
   a detector electrode disposed adjacent said other surface of said sheet material in electrical spark gap spaced relationship to the first recited electrically conductive means;
   a second power source in circuit with said detector electrode;
   spark detector means in circuit with said detector electrode for detecting the spark gap current flow between said detector electrode and said grounded electrically conductive means when a hole in the sheet material is in registration therewith; and
   means for continually moving said sheet of dielectric material first into contact with said electrical charging electrode and then past said detector electrode.

2. Apparatus according to claim 1 wherein the first recited electrically conductive means is comprised in an electrically conductive substrate contiguous to and continuous with the sheet of dielectric material.

3. Apparatus according to claim 1 in combination with means to remove the electrical charge imposed on said sheet after said sheet has passed said detector electrode.

4. Apparatus according to claim 2 wherein said electrically conductive substrate and said sheet of dielectric material are laminae comprised in a sheet material product.

5. Apparatus according to claim 1 in combination with indicia producing means in circuit with said spark detector means, operably connected thereto to produce sensible indicia in response to signals from the spark detector means.

6. Apparatus according to claim 5 wherein said indicia producing means is a recorder adapted to produce a continuous graph having marks corresponding to the locations of faults detected in the sheet of dielectric material.

7. Apparatus according to claim 5 wherein said indicia producing means is a film marking device operably arranged and disposed to mark the locations of detected faults on the sheet of dielectric mataerial.

8. Apparatus according to claim 5 wherein said indicia producing means is a signaling device.

9. A method for detecting small holes in a sheet of continuously advancing dielectric material comprising the steps of:
   contacting one surface of said sheet with a grounded electrically conductive element;
   imposing an electrical charge on the other surface of said sheet;
   passing said sheet through a gap defined between said grounded electrically conductive element and an electrode;

charging said electrode to a potential sufficient to effect discernable spark gap current flow between said electrode and said grounded electrically conductive element when a hole in the sheet material is in registration with the electrode and the grounded electrically conductive element, and detecting said current flow.

10. A method according to claim 9 in combination with the stop of removing the first recited electrical charge from the sheet after it has passed through said gap.

11. A method according to claim 9 in combination with the step of producing discernable indicia proportional to the spark gap current flow between said grounded electrically conductive element.

* * * * *